(12) United States Patent
Hirayama

(10) Patent No.: US 6,763,429 B1
(45) Date of Patent: Jul. 13, 2004

(54) METHOD AND APPARATUS FOR RECORDING AND PLAYING BACK INFORMATION

(75) Inventor: Hiroshi Hirayama, Yokohama (JP)

(73) Assignee: Hitachi, Ltd. (JP)

( * ) Notice: Subject to any disclaimer, the term of this patent is extended or adjusted under 35 U.S.C. 154(b) by 710 days.

(21) Appl. No.: 09/644,288

(22) Filed: Aug. 22, 2000

(30) Foreign Application Priority Data

Mar. 31, 2000 (JP) .................................. P2000-101196

(51) Int. Cl.[7] .......................................... G06F 12/00
(52) U.S. Cl. ...................... 711/112; 711/165; 710/57
(58) Field of Search ..................... 711/114, 111, 112, 711/113, 165; 710/52, 57; 369/84; 360/15

(56) References Cited

U.S. PATENT DOCUMENTS 6,233,649 B1 * 5/2001 Hirayama et al. .............. 711/4
6,292,626 B1 * 9/2001 Ino et al. ..................... 386/125

FOREIGN PATENT DOCUMENTS

JP 11328824 11/1999

* cited by examiner

*Primary Examiner*—Matthew Kim
*Assistant Examiner*—Matthew D. Anderson
(74) *Attorney, Agent, or Firm*—Townsend and Townsend and Crew LLP

(57) ABSTRACT

A recording method and apparatus includes first and second recording media. A first portions of information to be recorded is stored on the second recording medium as leading information. Subsequent portions of information to be recorded are stored on the second recording medium as temporary information. The leading information is read out and stored on the first recording medium. The temporary information then follows. As the temporary information is transferred from the second to the first recording media, new information is read into the second recording medium. A playback method and apparatus includes reading out leading information stored on the second medium. Meanwhile, information is read out of the first recording medium and stored to the second recording medium as temporary information. As the temporary information is played back from the second recording medium, new information is read in from the first recording medium.

25 Claims, 11 Drawing Sheets

METHOD AND APPARATUS FOR RECORDING AND PLAYING BACK INFORMATION

CROSS-REFERENCES TO RELATED APPLICATIONS

The present application is related to and claims priority from Japanese Patent Application No. 00-101196, filed on Mar. 31, 2000.

BACKGROUND OF THE INVENTION

The present invention relates to a device for recording and writing back information and method of recording and writing back for the same. More specifically, the present invention relates to a device and method for recording and playing back information where the information spans multiple recording media, recording being performed so that continuity of the information is maintained, and playback of the information being performed so that continuity of the information is maintained.

In disk changer devices being implemented as file server system devices for computer systems, high effective storage capacity is provided using multiple optical disks that can be automatically changed in a recording/playback device for optical disks. The optical disks are rewritable optical disks such as DVD-RAM (Digital Versatile Disc-Random Access Memory) or DVD-RW (Digital Versatile Disc-Rewritable). Further expected applications that take advantage of these high capacities include home server devices that can record and playback information over a long period of time, e.g., multiple broadcast programs.

For example, in the technology described in Japanese Laid-Open Patent Publication Number Hei 11-328824, fixed recording/playback means such as a hard disk device is combined and controlled together with a disk changer device that handles multiple removable recording media such as optical disks. When information is being recorded and disks are changed, information continues to be transferred. This information is stored temporarily on the hard disk device as linking information. After recording to the optical disk is completed, the linking information is recorded at the start or at the end of the information recorded on the optical disk. This allows the continuity of the recorded information to be maintained so that information can be recorded in a defect-free manner spanning multiple disks. When playing back the information, the linking information is temporarily stored in the hard disk device before playing back is begun. Then, when a disk change takes place during the playback operation, the linking information present on the hard disk device is playback so that the continuity of the information can be maintained during the playback operation without interruption.

With the growth in digital broadcasting and the increase in the number of channels available for broadcast programs, it is expected that the number of programs that a particular user may want to record will increase. Furthermore, broadcast receiver tuners have been implemented equipped with hard disk devices that are programmed to perform automatic scheduling of recording operations, allowing the recording of programs desired or frequently watched by a user. In such cases, a limitation is imposed by the recording capacity of a single hard disk device or the recording capacity of a single optical disk. If there is insufficient space available, the recorded information must be removed or the recording operation must be interrupted. Also, since the hard disk devices cannot be swapped, it would only be possible to swap the devices themselves. Thus, usage other than for the recording of temporary information should be minimized.

For these reasons, disk changers that perform recording and playback while automatically changing disks can eliminate the inconveniences associated with disk-changing. Since multiple disks can be treated as a single imaginary high-capacity recording medium, long programs can be recorded without needing to be concerned about the recording capacity left on a single optical disk. However, it is necessary to use the recording capacity in each optical disk efficiently and time continuity must be maintained for the recording and playing back of information during the changing of disks. Furthermore, search operations on the recorded programs must be efficient.

Since the user will select a program to view out of multiple recorded programs, the optical disk containing the information for the selected program will often not be inserted into recording/playback means in the disk changer device. The searching and changing of the target disk can result in a delay on the order of dozens of seconds between the selection of a program to be played and the actual playback of the recorded program. Similar problems are involved when a selected recorded program that is being played back is interrupted and a different recorded program is selected and played back. These problems decrease the ease of use of the device.

Also, when information is recorded from start to finish so that it spans multiple disks in order to make effective use of storage capacity in individual optical disks, disk changing intervals take place during which no recording is performed. Thus, the information recorded on the optical disks will be incomplete. In the conventional technology described above, information from the disk changing interval is recorded temporarily to a hard disk device as linking information, and this linking information is recorded in an assigned linking information area on the optical disk. This allows time continuity of the recorded information to be maintained while allowing information to be recorded without any gaps.

But in the conventional technology described above, if the recorded program selected for viewing spans multiple disks, linking information for the interval in which the disk changing takes place must be read and stored on the hard disk device before playback is begun. As a result, a delay of dozens of seconds is required between the selection of a recorded program to view and the actual start of playback so that the target optical disk can be changed in. Also, time to record the linking information to the hard disk device is required. These issues lead to the problems described above.

SUMMARY OF THE INVENTION

In accordance with the present invention, apparatus and method for recording on an information device includes a first data transfer component configured to store recording information on a first recording medium. There is a second data transfer component configured to store recording information on a second recording medium and to retrieve information recorded on the second recording medium. A control circuit is provided to transfer data between the first and second data transfer components. A leading section of recording information is stored on the second recording medium as leading information. Subsequent recording information is stored on the second recording medium as temporary information. The control circuit controls the second data transfer component to read out unread information first from the leading information and then from the temporary information so that continuity of recording information is maintained.

In accordance with another aspect of the invention, apparatus and method for reading from an information device includes a first data transfer component configured to retrieve recording information from a first recording medium. A second data transfer component is provided to store and subsequently retrieve recorded information on a second recording medium. A control circuit provides data transfer between the first and second data transfer components. In response to receiving a playback signal, the control circuit controls the second data transfer component to search for and read out leading information stored on the second recording medium. The control circuit detects when the first recording medium is ready for reading out data and in response thereto controls the first transfer component to read from the first recording medium associated information subsequent to the leading information. The control circuit further controls the second transfer component to record the associated information as temporary information on the second recording medium and to read out the temporary information so that continuity of playing back the recorded information is maintained.

The present invention performs recording and playback of information spanning multiple optical disks without generating gaps and minimizes the delay before playback is begun.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

The following is a description of the embodiments of the information recording/playback device according to the present invention, with reference to the drawings.

Figure 1:
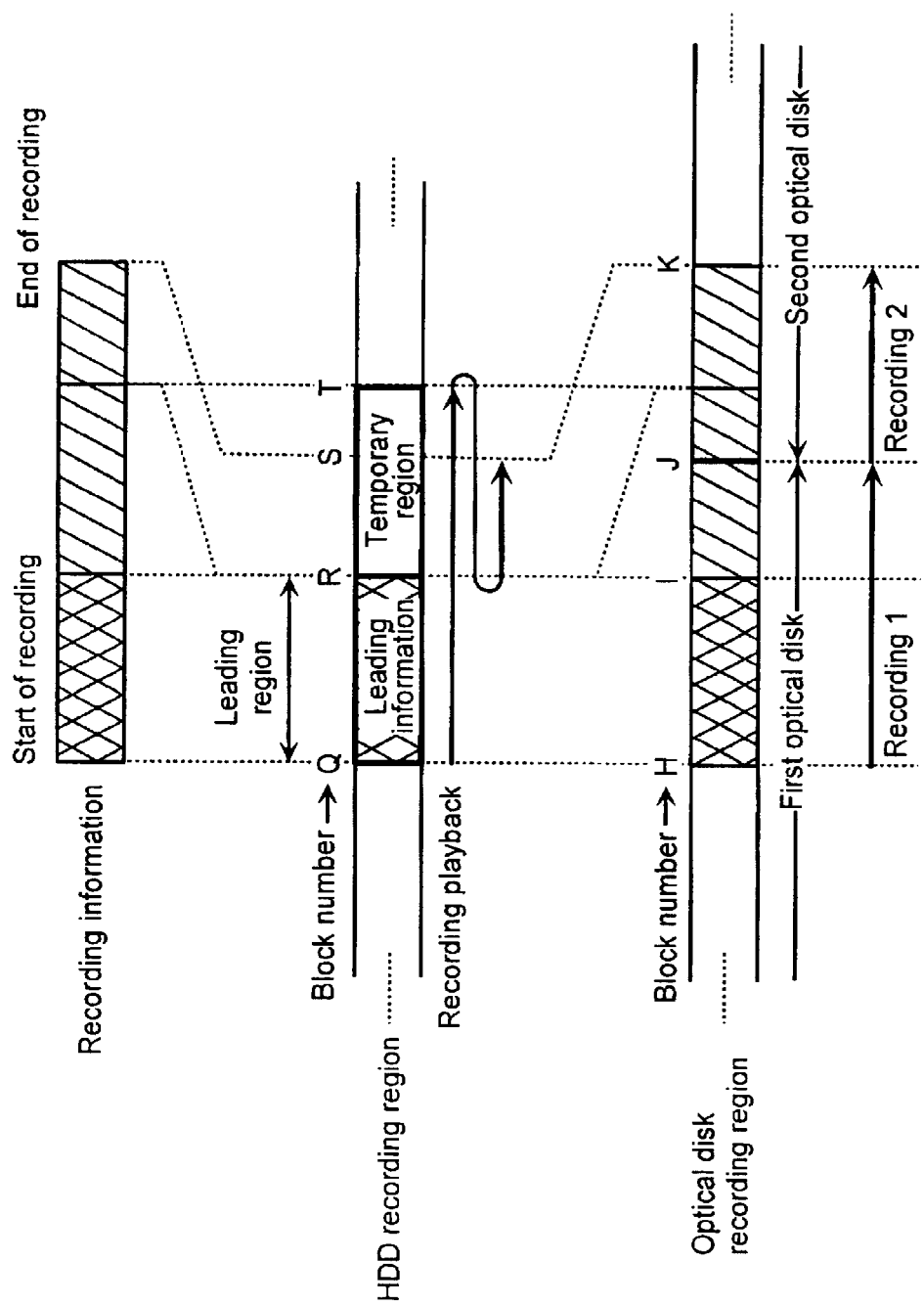
FIG. 1 is a drawing showing a method for recording information spanning multiple optical disks.
Figure 2:
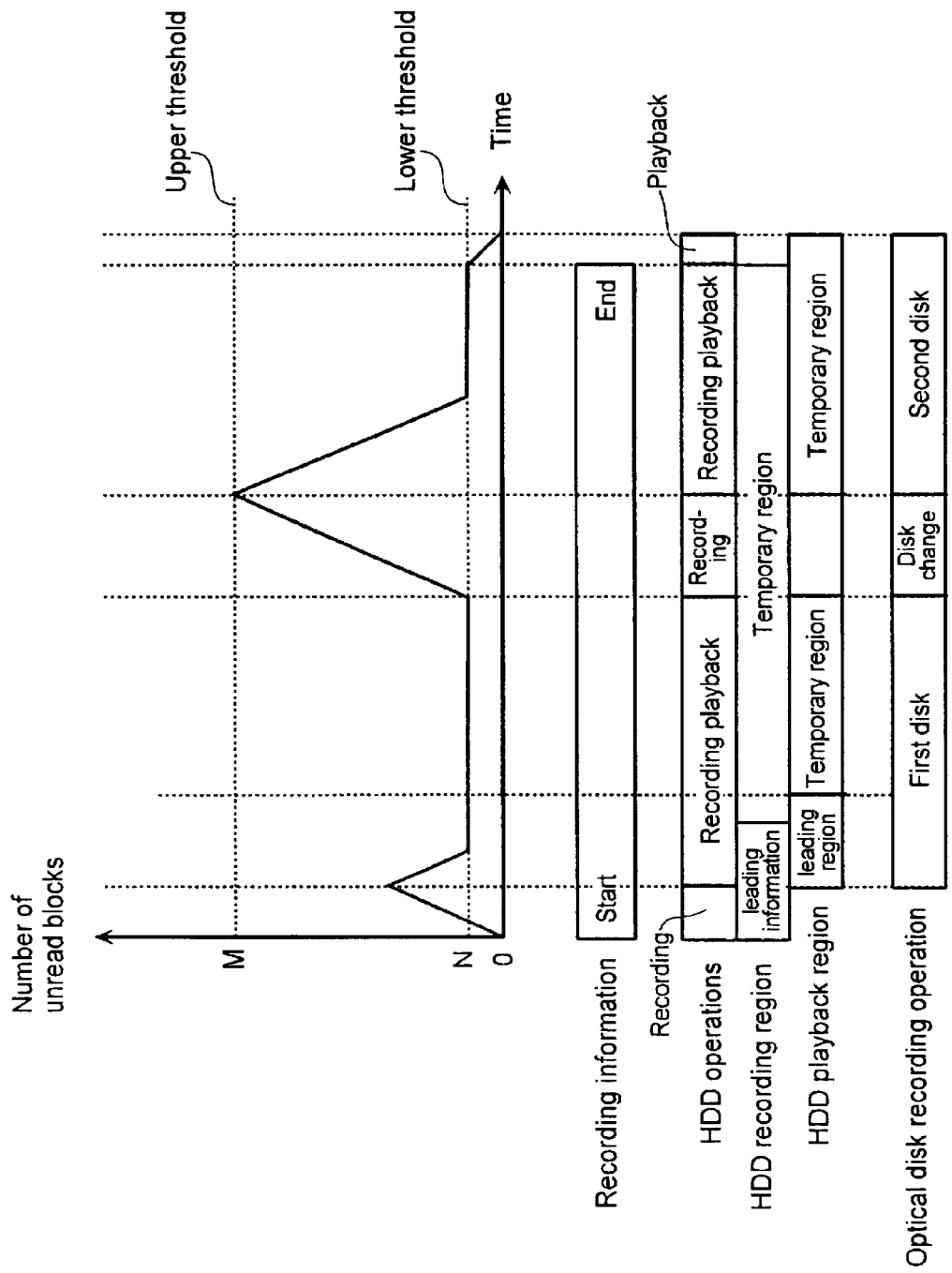
FIG. 2 is a drawing illustrating an example of a method for controlling an HDD and an optical disk drive when recording information.
Figure 3:
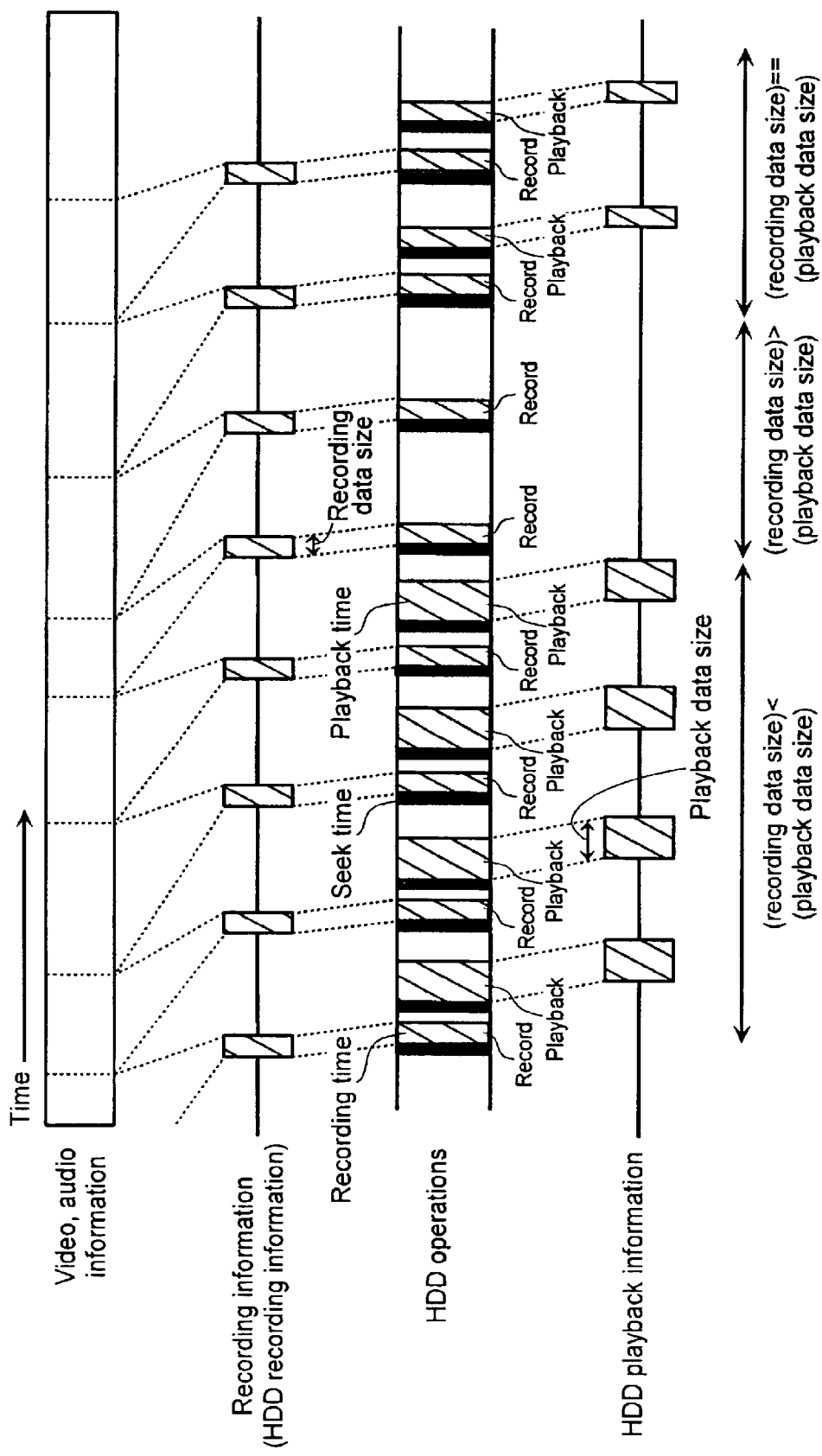
FIG. 3 is a drawing showing how recording instructions and playback instructions are generated for an HDD when information is being recorded.
Figure 4:
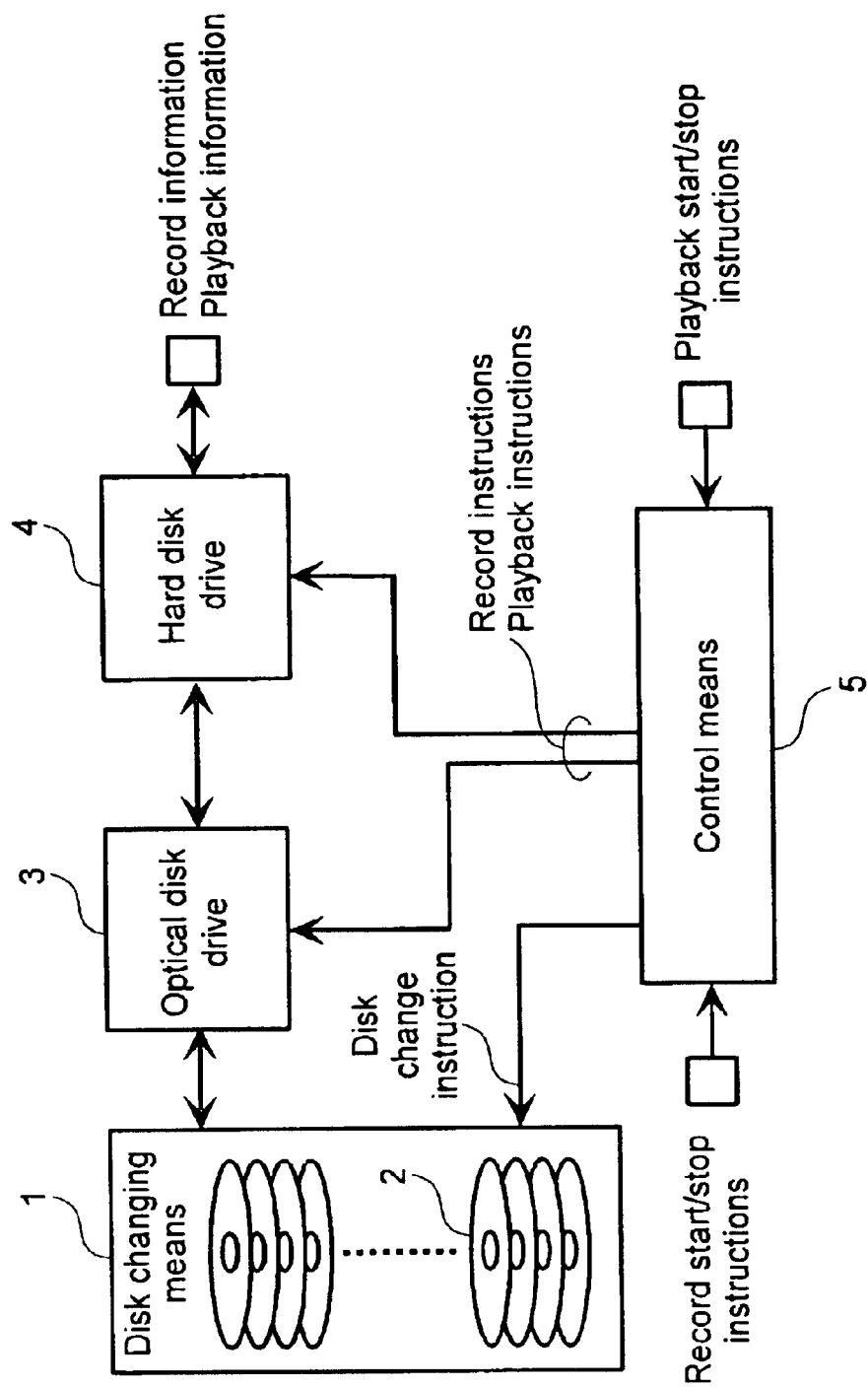
FIG. 4 is a drawing showing a first architecture of a recording/playback device.

FIG. 1 shows a first embodiment of a method for recording information used in an information recording/playback device according to the present invention. This figure shows a recording method that uses recording/playback means characterized by a high transfer rate and high-speed access such as in hard disk drives (hereinafter referred to as HDDs). In this method, the playback delay time involved in playback is minimized and information can be recorded spanning multiple optical disks without gaps. FIG. 2 is a schematic diagram showing the recording and playback of information on a HDD from start to finish, the recording of information on an optical disk, and the changes in the number of blocks not played back in the recording areas on the HDD. FIG. 3 shows examples of recording and play back operations on the HDD. FIG. 4 shows a sample architecture of a device.

In FIG. 4, there is shown: disk changing means 1 automatically changing optical disks for an optical disk drive; optical disks 2 on which information can be written (e.g., DVD-RAM, DVD-RW); an optical disk drive 3 recording and playing back information to and from the optical disks; an HDD 4 temporarily storing information to be recorded to the optical disks and playing this information back so that the information is sent to the optical disk drive for recording, as well as temporarily storing playback information from the optical disk drive and playing this information back as playback information. The HDD 4 is characterized by faster access and higher transfer rates compared to the optical disk drive. There is also shown controlling means 5 controlling recording and playback operations of the HDD and the optical disk drive as well as generating disk changing instructions for disk changing means.

First, with references to FIG. 1, there will be described an example of an recording method for information spanning multiple optical disks using the HDD and the optical disk drive from FIG. 4. Referring to FIG. 1, recording areas on the HDD and recording areas on the optical disk are assigned before recording information. The HDD is a fixed recording/playback means with limited recording capacity. In the section of the recording region on the HDD from a block number Q (where Q is an integer) to a block number (T-1) (where T is an integer), a region from the block number Q to a block number (R-1) (where R is an integer) is assigned as a leading information region for storing the initial recording information (e.g., several dozen seconds worth of information). The region from the block number R to the block number (T-1) is assigned as a temporary region. When information is to be recorded to these regions, the leading recording information is stored from the leading block Q of the leading region up to the final block (T-1) of the temporary region. If more information remains to be recorded, recording is performed again in the temporary region from the block number R to the block number (T-1). In other words, recording to the HDD is controlled so that the temporary region forms a ring buffer, and the leading region keeps only the initial recording information as the leading information.

The following is a description of the storage capacity to be assigned for the leading region and the temporary region. For example, if the 15 seconds is the maximum total time of the time required by the optical disk drive to change disks, the time required for rewriting the disk management information after recording to an optical disk is finished, and the time required for reading the management information once a disk is inserted, and if the maximum transfer rate for information to be recorded is 5 Mbit/sec, then the recording capacity needed for each of the regions is 5 Mbit×15 sec=75 Mbit. If 512 bytes (4 Kbits) is the recording capacity for one block, which is the basic storage unit in the HDD, then the number of blocks needed for each of the recording regions is 18.75 Kblocks. Thus, at least this number of blocks is assigned for the leading region and the temporary region. The leading region and the temporary region do not have to have consecutively numbered blocks, and the required number of blocks can be provided by combining non-consecutive regions. Also, the leading region and the temporary region do not need to be assigned the same number of blocks. For the temporary region, only the time required for one disk change need be considered. For the leading region, when optical disks selected for playback are being changed, a selection may be made for playback of a different optical disk. This can require double or more disk changing time compared to normal cases. Thus, assignments can be made for a block count that takes this possibility into account. Also, blocks, which serve as the basic recording units, may have different storage capacities for the HDD and optical disks. For example, one HDD block may be 512 bytes while one optical disk block may be 2048 bytes, resulting in a 1:4 relationship. In this case, the number of blocks in the leading region must be a multiple of 4, and the region must be assigned based on this proportion. Regarding the temporary region, the block count does not need to assigned based solely on the storage capacity corresponding to the disk-changing interval. For example, all available space on the HDD can be used as the temporary region, with this region being used as a ring buffer that temporarily stores recording information.

In assigning recording regions for multiple optical disks, an imaginary continuous recording region spanning the multiple optical disks is set up beforehand by finding partitions indicating the recording region and reading the disk management information (volume identifier) from each of the optical disks. In FIG. 1, for example, a region extending from a block number H to the final block is assigned as the recording region for a first optical disk and a region starting with a block number J is assigned as the recording region for a second optical disk. When recording to the region spanning the first and the second optical disks, information is recorded sequentially starting with the block number H on the first optical disk in response to the information transferred as a result of the playback from the HDD beginning with the leading region and followed by the temporary region. Then, the disk is changed and information is written sequentially from the block number J on the second optical disk until all the information from the HDD has been played back, thereby allowing information to be written from start to finish spanning the first and the second optical disks. The recording regions assigned on the first and second optical disks do not need to be formed from consecutive block numbers on the optical disk. Regions with non-consecutive block numbers can be combined in the assignments. Also, regions do not need to be assigned so that they include the final block on the first optical disk and the first block on the second optical disk, as shown in the figure. Various methods of assigning regions can be implemented. For example, a region containing the final block of the first optical disk and a region in the middle of the second optical disk can be assigned, a region in the middle of the first optical disk and a region containing the first block of the second optical disk can be assigned, regions that do not contain final or first blocks can be assigned, and regions can be assigned on the first optical disk only.

The following, with references to FIG. 2, is a description of the control operations used to implement the recording method described for FIG. 1, i.e., control operations involved in recording to and playing back from the HDD, recording to the optical disk, and changing disks. Referring to FIG. 2, the HDD is controlled by controlling means so that only recording operations are performed during the interval between the commencement of the transfer of recording information and the completion of preparations for recording to the first optical disk. During the interval between the commencement of recording to the region assigned on the first optical disk and the completion of this recording operation, hard disk operations are divided over time between recording operations and playback operations. This allows recording information to be recorded and played back so that it can be transferred to the optical disk. In response to the information transferred from the HDD once playback is begun, the optical disk drive stores this information sequentially starting with the block number H on the first optical disk up to the final block in the assigned region. If the HDD is splitting up recording operations and playback operations over time, however, the recording operation is performed so that the region being currently played back from the leading region or the temporary region does not catch up with the region being recorded, i.e., the recording and playback operations of the HDD is controlled so that there are no gaps in the recording information. Then, during the interval between the completion of recording operations to the final block in the assigned region of the first optical disk and the completion of preparations for recording to the second optical disk, playback operations from the HDD are stopped and only recording operations are performed. When information can be recorded to the second optical disk, operations are split between recording operations and playback operations. The optical disk drive starts at the block number J of the second optical disk to sequentially record the information transferred once playback from the HDD has been resumed. Finally, the recording operations to the HDD are stopped in response to the completion of the transfer of recording information. Playback operations are continued for the blocks in the temporary region that have not been played back yet, and playback and recording to the second optical disk is continued until all the playback blocks have been played.

The following is a description of an example of how the number of unread blocks changes over time during recording and playback operations to the leading region and the temporary region of the HDD. As recording information is transferred, it is recorded sequentially to the leading region and the temporary region, increasing the number of unread blocks. When preparations for recording to the optical disk have been completed and playback is being performed on the unread blocks, the recording and playback operations of the HDD are controlled so that, for example, the number of blocks to be played back in response to one playback instruction is greater than the block count used for one recording instruction, i.e., (size of data to be recorded)<(size of playback data) per unit time. As a result, the number of unread blocks will tend to decrease. The HDD is equipped with a transfer rate and access properties that allow it to perform recording and playback operations in which (size of data to be recorded)<(size of playback data) per unit time for the leading region and the temporary region assigned beforehand. Also, the leading region and the temporary region are set up in recording regions that allow these operations to be performed by the HDD. This will be explained later with reference to FIG. 3. When playback operations are continued according to the method described above, the playback region will catch up to the current recording region from which the information to be recorded is taken. Thus, controlling means decreases the number of playback instructions it generates so that the number of unread blocks does not fall below a lower limit (N blocks, where N is a positive integer and N>=1). Alternatively, the number of blocks to be played back can be set to be no more than the number of blocks to be recorded, thus providing a rate that is always close to a threshold value. Furthermore, when information cannot be recorded to an optical disk because a disk change is being performed, only recording operations are performed each time information to be recorded is transferred, thus increasing the number of unread blocks. However, the temporary region has been assigned a region corresponding to a block count that takes disk changes into consideration, i.e., the assigned region can at least hold an upper threshold M (where M is a positive integer) of the number of unread blocks. This prevents dropped data due to recording information being overwritten in the region containing unread blocks. However, even if the block count in the temporary region is adequate for disk changes, it is possible for a disk change to take longer than normal such as if a disk change fails, the available space on the new disk is insufficient, or the disk management information of the new optical disk cannot be read properly and the resulting read error causes another disk to be mounted. It would be possible to take these cases into account when assigning the temporary region. In another method, if the number of blocks not played back exceeds the threshold value M, controlling means assigns a virtual region on the HDD separate from the leading region and the temporary region before the temporary region overflows. In this case, if information has been recorded up to the final block of the temporary region and the optical disk has still not been prepared for recording, the recording information is stored in the virtual region. Once the optical disk has been prepared for recording and the playback of the remaining blocks in the temporary region and the virtual region has been completed, the virtual region is freed. Recording and playback is resumed, and information is recorded to the ring buffer, consisting solely of the temporary region, instead of to the virtual region. Then, once the second optical disk has been prepared for recording, the HDD resumes playback operations and generates playback instructions so that (size of data to be recorded)<(size of playback data) per unit time. This rate keeps the number of unread blocks at around a threshold value N. Finally, when the transfer of information stops, the recording operations are stopped and playback operations are continued until the number of unread blocks is 0.

The following is a description, with references to FIG. 3, of the recording and playback operations performed on the HDD for controlling the number of unread blocks shown in FIG. 2. In FIG. 3, the information to be recorded temporarily to the leading region and the temporary region can be, for example, video and audio signals that were originally continuous over time. Compression of this data provides video information, audio information, and accompanying auxiliary information, which are then multiplexed to form non-continuous recording information. Recording instructions are generated in response to the transfer of this non-continuous recording information. Based on these instructions, the HDD begins recording the specified number of blocks starting at the region corresponding to the target block number. Playback instructions can, for example, be generated in response to the completion of a recording operation resulting from a recording instruction. Based on the playback instruction, the HDD begins playback from the region corresponding to the playback target block number and plays back the specified number of blocks. As shown in FIG. 3, for example, the number of playback blocks specified by the playback instruction can be set greater than the number of recording blocks specified by the recording instruction so that recording operations and playback operations are performed in a manner that allows (recording time)<(playback time) per unit of time, i.e., (size of data to be recorded)<(size of playback data). As an example, an HDD can have a transfer rate of 100 Mbit/sec and a maximum rate of transfer for recording information of 5 Mbit/sec. A single recording operation could take 50 msec, while the maximum access time, i.e., the time between when a recording instruction is issued and when actual recording takes place, could be 50 msec or less. In this case, the total time required to record information would be 100 msec or less, and the remaining 900 msec or more can be used for playback. The transfer rate of the optical disk can be, for example, 25 Mbit/sec. The HDD playback time required for recording information to the optical disk would be 250 msec, and 300 msec or less when access time is added. The remaining 600 msec would be idle time. Thus, recording operations and playback operations can be split over time so that the transfer of information from the HDD per unit of time can fulfill the relationship (size of data to be recorded) <(size of playback data).

When the method described above is used to record information to optical disks, playback of the information requires information regarding the association between optical disks and the leading information and subsequent information they contain, the association between optical disks containing recording information spanning more than one optical disk, and the recording sequence thereof. To provide this, the information can be recorded on the HDD or an optical disk or another recording medium. When information is to be played back, controlling means reads this information to playback the leading information, and then plays back the information on an optical disk or spanning multiple optical disks.

Thus, in the recording method embodiment described above, controlling means assigns the regions on the HDD as described in FIG. 2 and FIG. 3 (leading region, temporary region, and virtual region), controls the recording operations and the playback operations for these regions, controls the recording operations for the optical disk drive, controls disk changing, and adjusts the number of unread blocks on the HDD. Thus, information can be recorded to optical disks with no gaps even if an optical disk change takes place during the recording of information or if an optical disk is not prepared for recording when the recording of information is about to begin.

Figure 5:
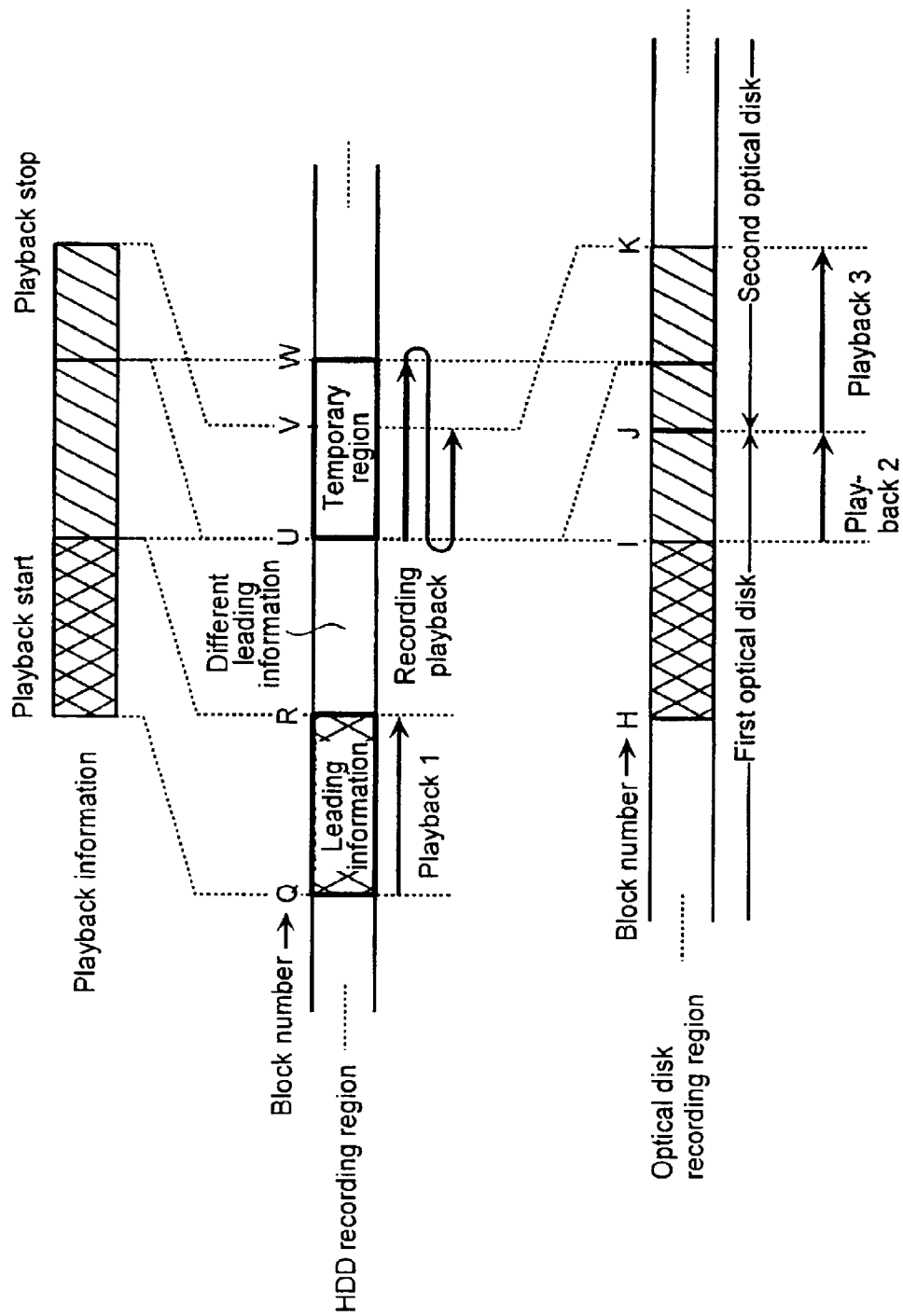
FIG. 5 is a drawing illustrating a method for playing back information spanning multiple optical disks.

The following is a description of a method for playing back information recorded according to the recording method described above, with references to FIG. 5, FIG. 6, and FIG. 7. First, a method for playing back recorded information spanning the first and the second optical disks using the HDD will be described, with references to FIG. 5. Before playing back the information recorded on the HDD and the optical disks, a temporary region is assigned with a storage capacity that into account the time involved in changing optical disks. In FIG. 5, the temporary region is assigned to a range from a block number U (where U is an integer) to a block number (W-1) (where W is an integer). This region comes after multiple leading information regions on the HDD. In the region from a block number Q to a block number (R-1), there is the leading information from recorded information spanning the first and the second optical disks. The temporary region assigned on the HDD is formed as a ring buffer from the block number U to the block number (W-1). This ring buffer stores the playback information that follows the leading information on the first optical disk, starting with a block number I (where I is an integer) through a final block K (where K is an integer) recorded on the second optical disk. When the leading information and the temporary region on the HDD are to be played back in response to a request to start transfer of playback information, the leading information is played back. Then, out of the information transferred from the optical disks and recorded in the temporary region, the information that has not yet been played back is played back. The recording capacity needed for the temporary region is determined by using the temporary region assignment method described with reference to FIG. 1. The temporary region can be assigned to a region that is not in proximity with the region in which the leading information is recorded. Also, the region needed for the temporary region can be formed as a combination of non-contiguous regions having non-consecutive block numbers. In addition, it would also be possible to assign temporary regions so that when information is to be recorded to the optical disk, the temporary region is kept along with the leading region assigned on the HDD. This allows the temporary region to be used in association with the leading information when playing back information from the optical disk. The information spanning multiple optical disks is recorded from the block number H to the final block of the first optical disk and from the block number J to the block number (K-1) on the second optical disk. When playing back the optical disks, playback is begun on the first optical disk from the block number I, which follows the leading information recorded on the HDD from the block number Q to the block number (R-1). During the playback operation, a disk change takes place when the final block of the region following the leading information on the first optical disk is played. Then playback is performed up to the block number (K-1) of the second optical disk. With regard to the playback operation starting at the block number I on the optical disk, the HDD and the optical disks may have different storage capacities per block (the basic recording unit) as was mentioned in the description of the recording method shown in FIG. 1. The block number I on the optical disk at which playback is to be begun can be determined by using the block size ratio between HDD and optical disk blocks to convert the number of blocks used in the leading information on the optical disk, and adding this converted value to the starting block number H on the optical disk. Also, instead of solely assigning the temporary region with a size corresponding to the disk changing interval, the number of blocks in the temporary region can be assigned, for example, based on the available capacity of the HDD so that this region can serve as a ring buffer into which the information transferred from the optical disk is temporarily recorded.

Figure 6:
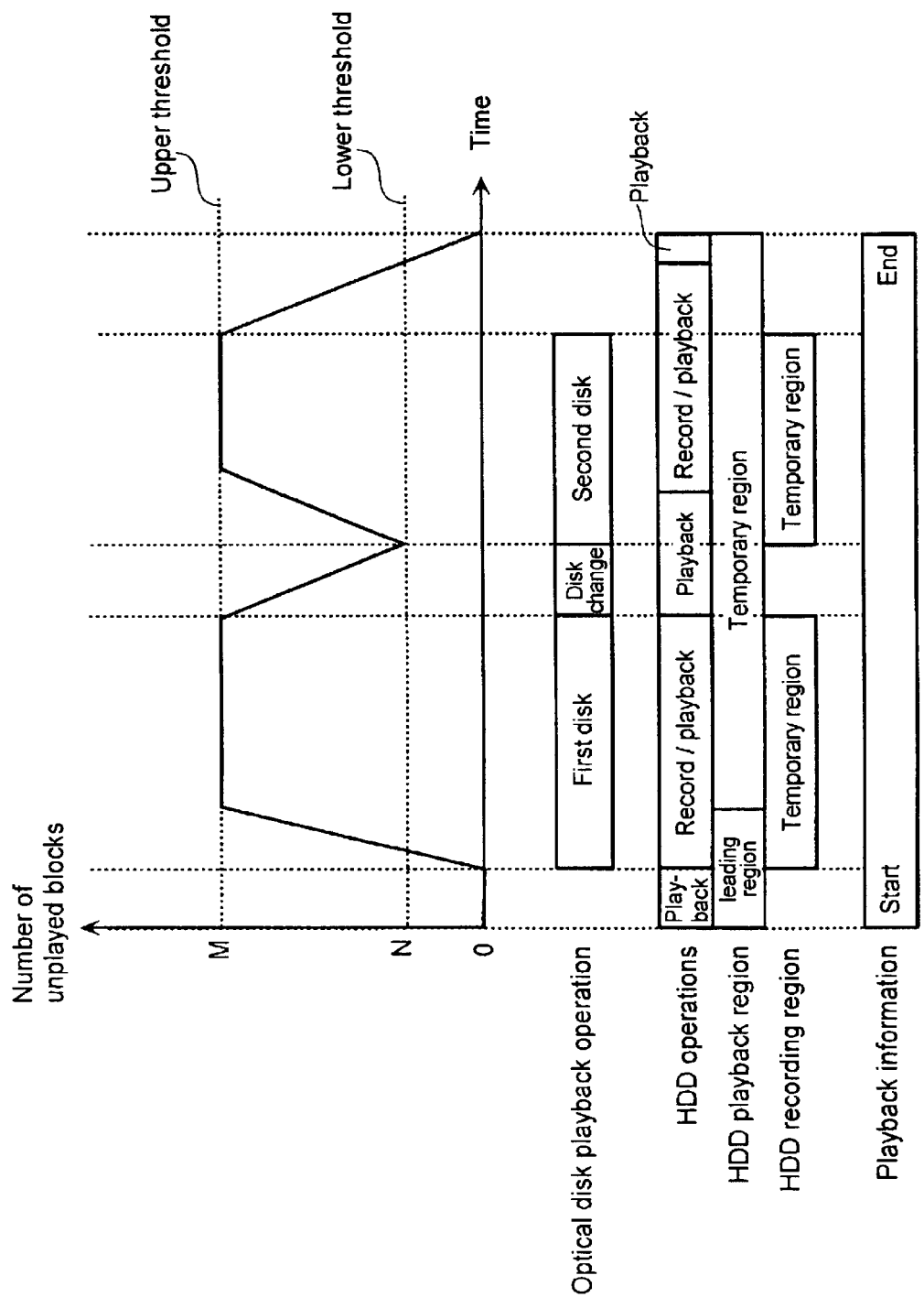
FIG. 6 is a drawing illustrating an example of a method for controlling an HDD and an optical disk drive when playing back information.

The following is a description, with references to FIG. 6, of control operations performed to implement the playback method described with reference to FIG. 5, including control operations for recording to and playing back from the HDD and control operations performed for playing back and changing optical disks. In FIG. 6, controlling means responds to a request for transfer of playback information by performing playback operations starting with the beginning of the leading information on the HDD. Only playback operations are performed while the optical disk is being prepared for playback. Starting with playback from the block number I of the first optical disk to the final block (J-1), playback operations are alternated over time with recording operations, thus providing recording operations for the information transferred from the first optical disk and playback operations for the request to transfer playback information. As recording operations and playback operations are alternated over time, the current playback region in the temporary region does not catch up to the recording region, i.e., recording and playback operations are controlled so that there are no gaps in the transfer information from the optical disk. Next, during the interval from when the final block of the first optical disk has been played back to when the second optical disk is ready for playback, recording operations are stopped and only playback operations in response to requests for transfer of playback information are performed. Then, during the interval from when transfer from the second optical disk is begun to when the block number (K-1) has been transferred, recording operations and playback operations are alternated over time. Finally, when transfer from the second optical disk is completed, the playback of the optical disk is stopped, and the recording operation for the HDD is stopped. Only the playback operations in response to requests for transferring playback information are continued, and this goes on until no unread blocks remain.

The following is a description of an example of how the number of unread blocks can change as a result of recording and playback operations for the temporary region in the HDD. Once the optical disk is prepared for playback, the information transferred from the optical disk is recorded sequentially beginning with the start of the temporary region. Thus, the number of unread blocks in this region increases. The number of unread blocks will tend to increase when recording and playback operations for the HDD are controlled so that, per unit time, (recording time)>(playback time), i.e., (size of data to be recorded)>(size of playback data). For example, the recording block count specified in each recording instruction can be set to be greater than the block count specified for each playback instruction. At a minimum, the HDD has a transfer rate and access characteristics that allow it to perform playback and record operations in the pre-assigned temporary region so that, per unit time, (size of data to be recorded)>(size of playback data), and the temporary region is assigned in a recording region on the HDD that allows this relationship to be maintained. This will be described later with reference to FIG. 7. As the issuing of recording instructions described above continues, the number of unread blocks will exceed the number of blocks contained in the temporary region. In other words, information transferred from the optical disk will be overwritten without being played back, resulting in gaps in the playback information. For this reason, controlling means can, for example, set up an upper limit (M blocks, where M is an integer) for the unread block count and reduce the recording instruction issued per unit time so that the unread block count does not exceed this limit. Alternatively, the specified number of recording blocks can be set to a number that does not exceed the playback block count, thus keeping the unread block count close to the threshold value M. Furthermore, when playback from optical disks is not possible due to a disk change, the number of unread blocks is reduced since only playback operations in response to requests to transfer playback information are performed. However, underflows of unread blocks in the temporary region, i.e., gaps in playback information, are prevented during any disk changes. This is because disk changes are taken into account in the number of blocks assigned to the temporary region, i.e. the assigned region is, at a minimum, adequate for the upper threshold value M of unread blocks. Also, controlling means controls recording operations so that the unread block count is always close to M. Once the second optical disk is ready for playback, recording operations are resumed. Recording instructions are issued so that, per unit time, (size of data to be recorded)>(size of playback data), thus keeping the unread block count close to the threshold value M. Finally, when transfer of information from the second optical disk stops, recording operations are stopped while playback operations continue until the unread block count reaches 0.

Figure 7:
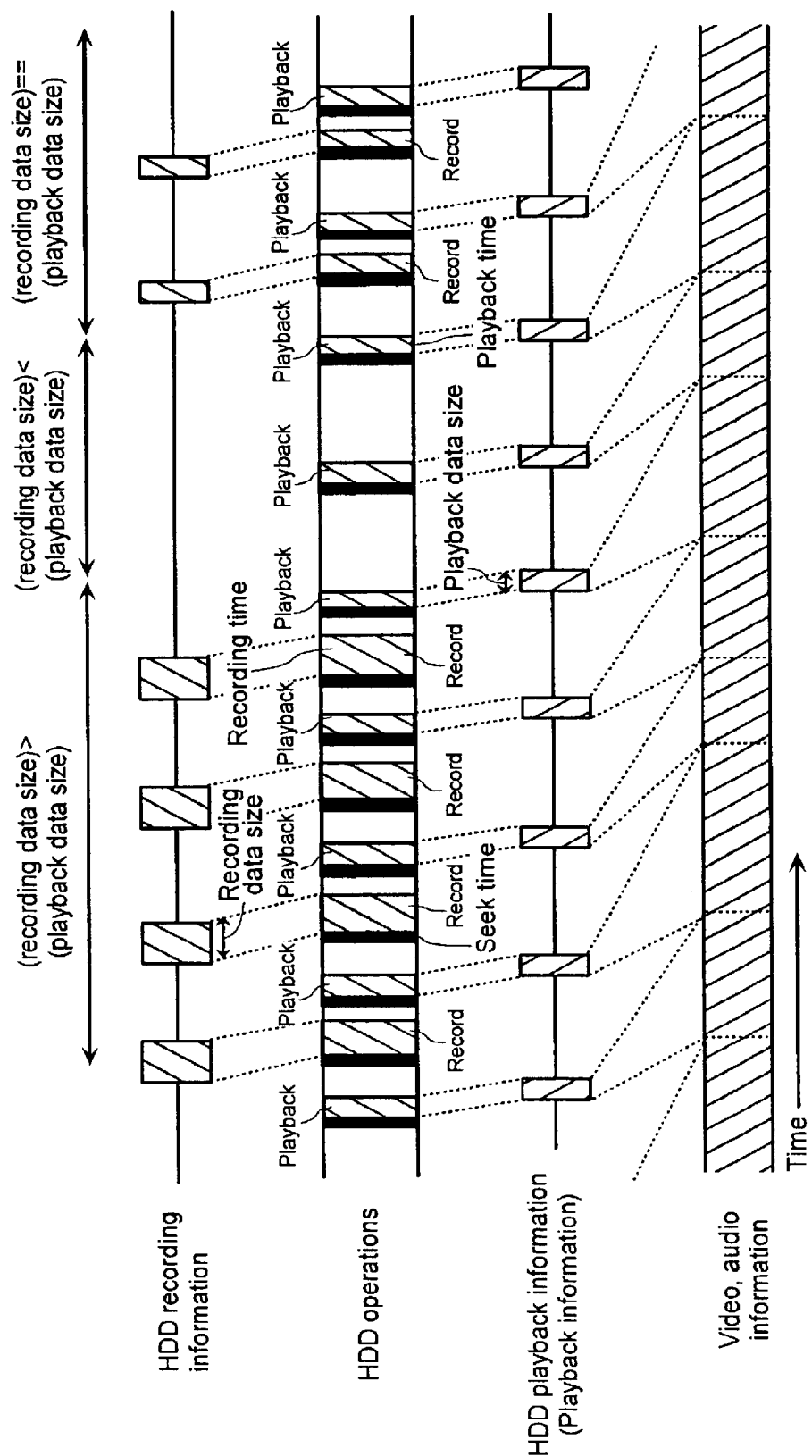
FIG. 7 is a drawing showing how recording instructions and playback instructions for the HDD are generated when playing back information.

The following is a description, with references to FIG. 7, of an example of recording and playback operations for the temporary region performed to control the unread block count as shown in FIG. 6. In FIG. 7, the information transferred from the optical disk and recorded temporarily to the HDD is originally the recording information described with reference to FIG. 3. Thus playback from the optical disk is performed in a non-continuous manner. As this non-continuous information is transferred, the HDD receives recording instructions and begins recording the specified number of blocks starting at the target block number in the temporary storage region. Playback instructions to the HDD are issued in response to requests to transfer playback information. When a playback instruction is received, playback of the specified number of blocks is begun from the region corresponding to the target block number in the leading information or the temporary region. As shown in FIG. 7, recording operations and playback operations are controlled so that, per unit time, (recording time)>(playback time), i.e., (size of data to be recorded)> (size of playback data). For example, the number of blocks to record contained in recording instructions can be set greater than the playback block count contained in playback instructions.

In the playback method embodiment described above, controlling means controls the unread block count of the HDD by using the controlling methods for HDD recording and playback operations and the controlling method for optical disk playback operations as described with reference to FIG. 6 and FIG. 7. As a result, if a disk change takes place when an optical disk is being played, no gap occurs in the playback information. Also, if an optical disk is not ready for playback when transfer of playback information from the HDD commences, or if the optical disk to be played back is in the process of being made ready, the playback delay time can be minimized by completing playback preparation for the optical disk while the leading information is being played back. Also, by controlling the unread block count so that it is always close to the threshold value M, a disk change can take place at any time without there being an underflow of unread blocks in the temporary region, thus further eliminating interruptions in the playback of information from the HDD obtained from playing back the optical disk.

The playback method described above can also allow special playback operations such as fast forwarding. For example, if a special playback operation involves skipping through the playback information, then playback can be performed by skipping the block numbers for the information transferred from the optical disk and recorded to the temporary region of the HDD. Since this playback operation for the temporary region will be performed faster than normal playback, the playback region played back for the special playback operation must be prevented from catching up to the unread region in the HDD by maintaining the relationship (size of data to be recorded to the HDD per unit time)<=(maximum size of data to be played back from the optical disk per unit time). This can be achieved either by setting the number of recording blocks specified for a single recording instruction to a high value or by increasing the number of recording instructions issued per unit time. When this type of special playback operation is to be performed, playback can be controlled so that the speed of the optical disk in the optical disk drive is increased and the amount of playback data per unit time is increased, thus allowing special playback operations at higher speeds. Also, when special playback operations are performed using the method described above, there is no need to record all information transferred from the optical disk to the HDD. Instead, special playback operations can be handled by only recording and playing back the transfer information necessary for special playback once special playback is begun.

Figure 8:
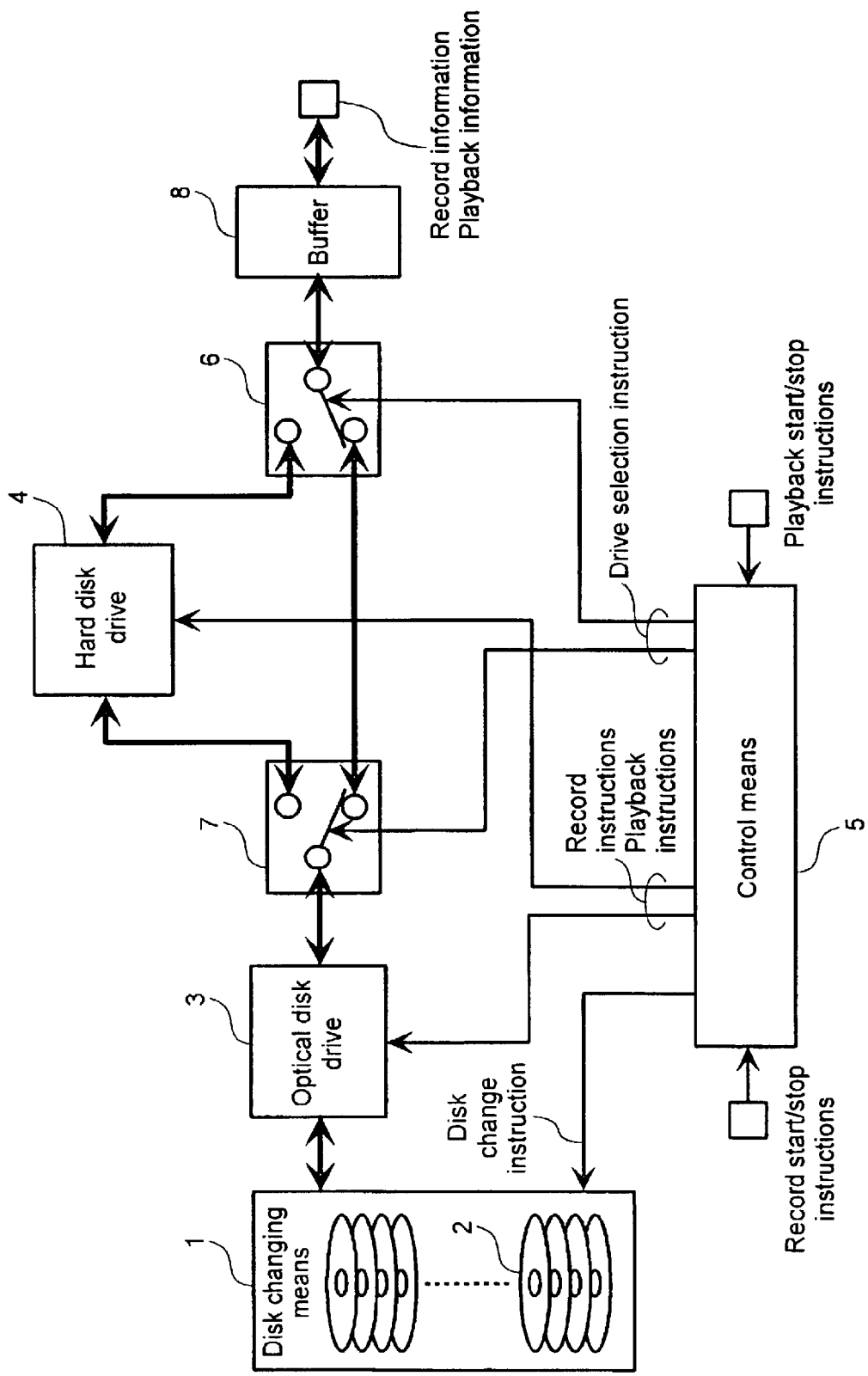
FIG. 8 is a drawing showing a second architecture of a recording/playback device.
Figure 9:
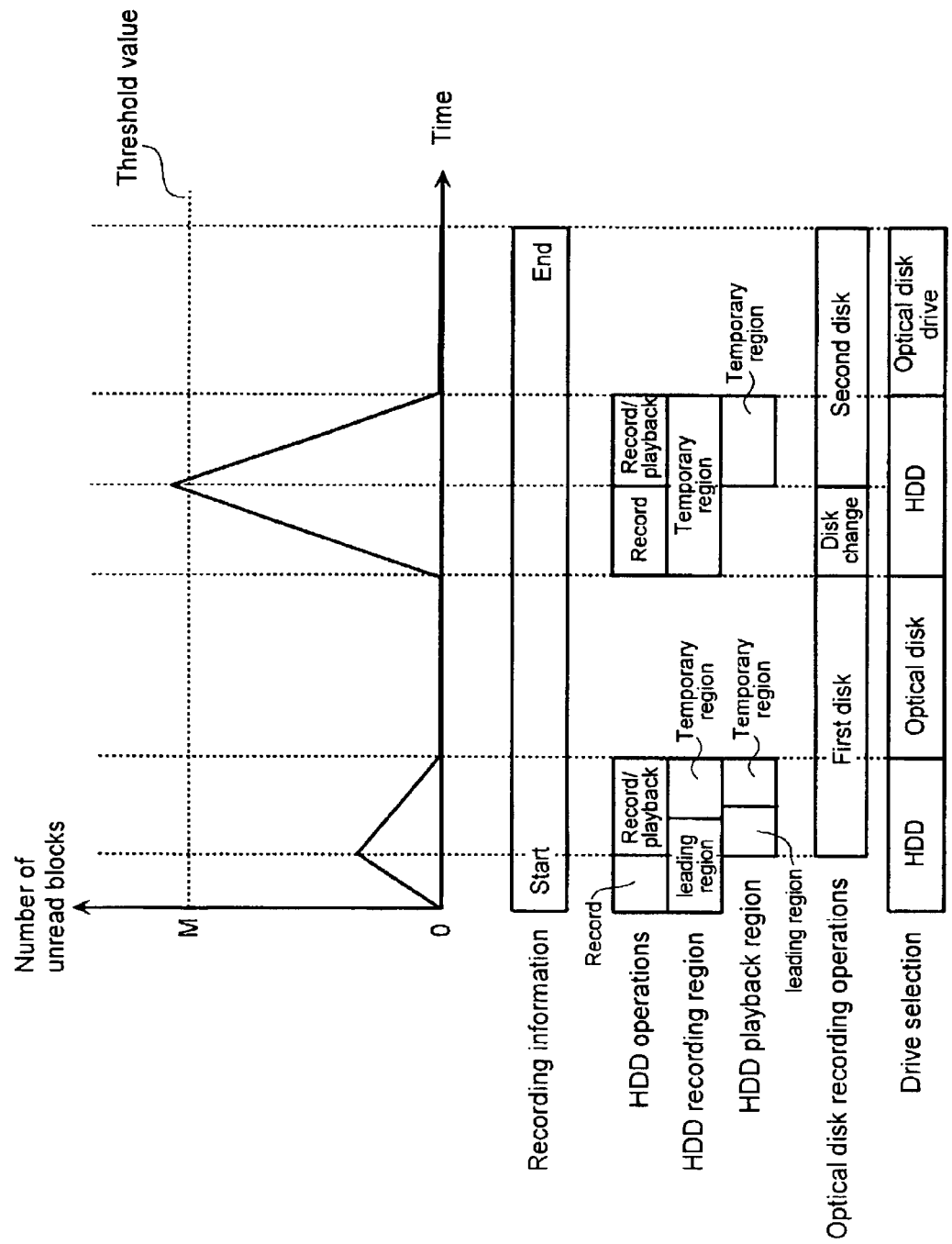
FIG. 9 is a drawing illustrating an example of a method for controlling an HDD and an optical disk when recording information.
Figure 10:
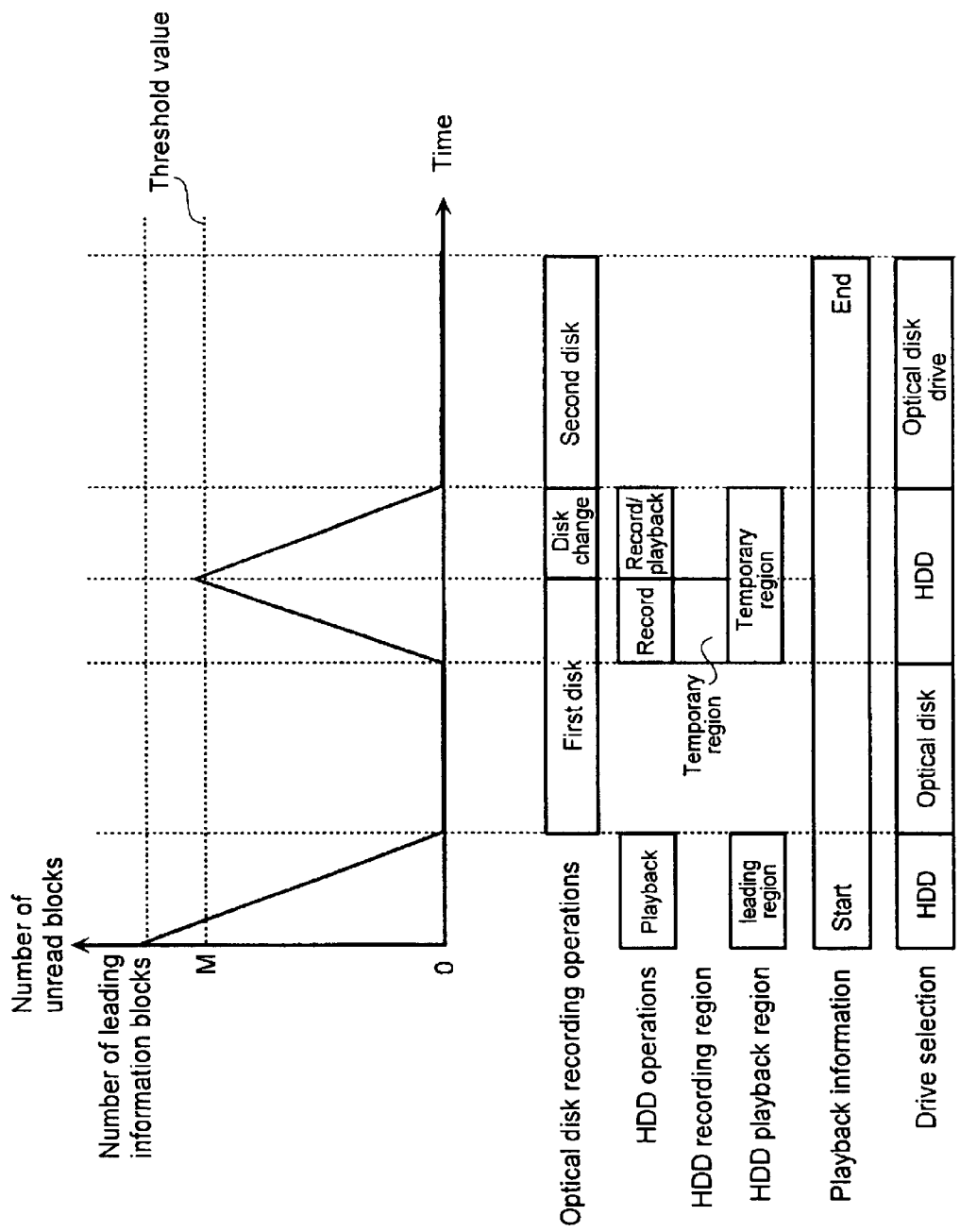
FIG. 10 is a drawing showing how recording instructions and playback instructions for the HDD are generated when playing back information.

FIG. 8 shows a second embodiment of a recording/playback device according to the present invention. The device includes: second selecting means 7 switching between inputs/outputs for the optical disk drive; first selecting means 6 switching between inputs/outputs for recording information and playback information; and a buffer 8 temporarily recording playback information. Other elements of the structure are identical to those from FIG. 4. Like numerals assigned to like elements and corresponding descriptions are omitted. FIG. 9 is a schematic drawing showing HDD recording/playback operations and optical disk recording operations, as well as the changes over time of the unread block count in the leading region and the temporary region of the HDD. FIG. 10 is a schematic drawing showing optical disk recording operations and HDD recording/playback operation, as well as the changes over time of the unread block count in the leading region and the temporary region of the HDD.

First, the method used to record information in FIG. 8 is similar to the method used for FIG. 1. FIG. 9 shows how the operations of the HDD, the optical disk drive, and first and second selecting means are controlled by controlling means of the recording/playback device from FIG. 8. There is also shown the change over time of the number of unread blocks in the pre-assigned leading region and the temporary region on the HDD. In FIG. 9, first and second selecting means selects the connection between the buffer and the HDD and between the HDD and the optical disk drive either before or after the transfer of recording information to the buffer is started. The HDD is controlled so that during the interval between when the transfer of recording information starts to when the first optical disk is prepared for recording, information from the buffer is recorded to the leading region and the temporary region. When the first optical disk is prepared for recording, recording operations and playback operations are alternated over time so that the unread blocks in the leading region and the temporary region are played back. The optical disk drive is controlled so that recording operations take place for the playback information transferred from the HDD. During this period, the unread block count increases until information can be recorded to the optical disk. Once information can be recorded to the optical disk, recording and playback operations for the HDD are controlled so that, per unit time, (size of data to be recorded)< (size of playback data), thus reducing the unread block count. Once playback of the blocks in the leading region and the temporary region catches up with the blocks recorded as unread blocks, i.e., once playback of all unread blocks is completed, and the information contained in the unread blocks has been recorded to the optical disk, the recording operations and the playback operations for the HDD are stopped and the recording operations for the optical disk are stopped. First and second selecting means are controlled so that the buffer output is directed to the optical disk drive.

Then, information is recorded to the optical disk while the size of data to be recorded, contained in the recording instruction to the optical disk drive, is adjusted to prevent buffer overflows and underflows. The transfer of recording information is continued while first and second selecting means are being switched, but the recording information transferred during this interval is recorded temporarily in the buffer to prevent gaps in the recording information, thus allowing the recording of information to continue while selecting operations are being performed by selecting means. When the information transferred from the buffer has been recorded up to the final block on the first optical disk, first and second selecting means are controlled to restore the original connection states, the information transferred from the buffer is recorded to the temporary region in the HDD, and disk changing means is controlled to change to the second optical disk. During this interval, the unread block count increases but the temporary region assignment in the HDD is adequate for preventing overflows of unread blocks. In other words, to take the time to change to the second disk into account, the temporary region is assigned to handle at least the upper limit M for unread blocks. Or, if it is possible that the optical disk may not be ready for recording even if the unread block count exceeds the threshold value M, i.e., if there might be an overflow of the unread block count in the temporary region, a virtual region separate from the temporary region can be set up temporarily in order to allow transfer information to be recorded temporarily. Once the optical disk is ready for recording and the playback of unread blocks in the temporary region and the virtual region is completed, the region assigned as the virtual region is freed so that no further information is recorded to this region, and recording and playback operations are controlled using only the temporary region as a ring buffer. Once the second optical disk is ready for recording, the recording operations for the HDD are continued and performed in alternation over time with playback operations, thus allowing the unread blocks in the temporary region to be played back and transferred to the optical disk. Then, when the unread blocks have been played back, control operations similar to those described above are performed on the HDD, the optical disk drive, and first and second selecting means so that recording can be performed to the second optical disk until the transfer of recording information is finished.

Next, the information playback method used in FIG. 8 is similar to the method shown for FIG. 5. FIG. 10 shows how the operations of the HDD, the optical disk drive, and first and second selecting means are controlled by controlling means of the recording/playback device from FIG. 8. There is also shown the change over time of the number of unread blocks in the pre-assigned leading region and the temporary region on the HDD. Before transfer of playback information is begun in FIG. 10, first selecting means connects the buffer for temporarily recording playback information and the HDD and second selecting means connects the optical disk drive and the HDD. Before the optical disk is ready for playback, the HDD is controlled so that the unread blocks in the leading information on the HDD is played back and recorded temporarily in the buffer. In response to requests to transfer information, playback information is output. During this interval, the number of unread blocks in the leading region decreases. When playback of the unread blocks is completed, playback operations of the HDD are stopped, first selecting means connects the buffer and the optical disk drive, and the information following the leading information on the optical disk is played back. Requests for transfer of playback information continue while first selecting means is performing a selecting operation, but information corresponding to the requests from the interval during which the selection operation is taking place is recorded temporarily in the buffer. This prevents underflows of playback information in the buffer, i.e., temporal gaps. Then, playback operations for the optical disk are controlled so that the playback data sizes contained in the playback instructions to the optical disk drive can be adjusted to prevent overflows and underflows of playback information in the buffer. As playback of the final block in the first optical disk approaches, first selecting means connects the buffer and the HDD, second selecting means connects the optical disk drive and the HDD, and playback operations take place all the way to the final block in the optical disk drive. Information transferred from the first optical disk is recorded to the temporary region of the HDD, and unread blocks are played back in response to requests to transfer playback information. Playback information continues to be transferred when first and second selecting means perform their selection operations, but, as described above, enough information is recorded in the buffer to prevent temporal gaps in the playback information when selection operations are taking place. During this interval, the playback operations for the optical disk are controlled so that, in the playback and recording operations of the HDD, (playback data size)<(recording data size) per unit time. As a result, the number of unread blocks increases. Also, until playback of the final block of the first optical disk is reached, the size of recording data per unit time is adjusted and the timing at which selecting means are switched is controlled so that the unread block counts occurring during recording to the temporary region is at least the number of blocks corresponding to the optical disk changing time (at least the threshold value M) and no more than the number of blocks contained in the temporary region. Then, after the optical disk drive finishes playback of the final block of the first optical disk, the disk is changed to the second optical disk. During this interval before the second optical disk is ready for playback, the number of unread blocks in the HDD decreases, but there are enough unread blocks in the temporary region that can be played back that gaps in the playback information from the buffer are prevented. Then playback is begun from the second optical disk. When there are no more unread blocks in the temporary region, the playback operation for the HDD is stopped, first selecting means connects the buffer and the optical disk drive, playback is begun from the starting block of the second optical disk, and playback is continued until the end of the information is reached.

Thus, controlling means can be used to provide similar advantages as those of the recording/playback device shown in FIG. 4 by following the above description in performing recording and playback operations with the HDD, performing selection operations with first and second selecting means, and performing recording and playback operations for the optical disk drive. In the case of this sample architecture, the time involved in recording and playback operations with the HDD can be kept to a minimum, and the HDD can easily be used for recording and playback of other information when in an idle state.

Figure 11:
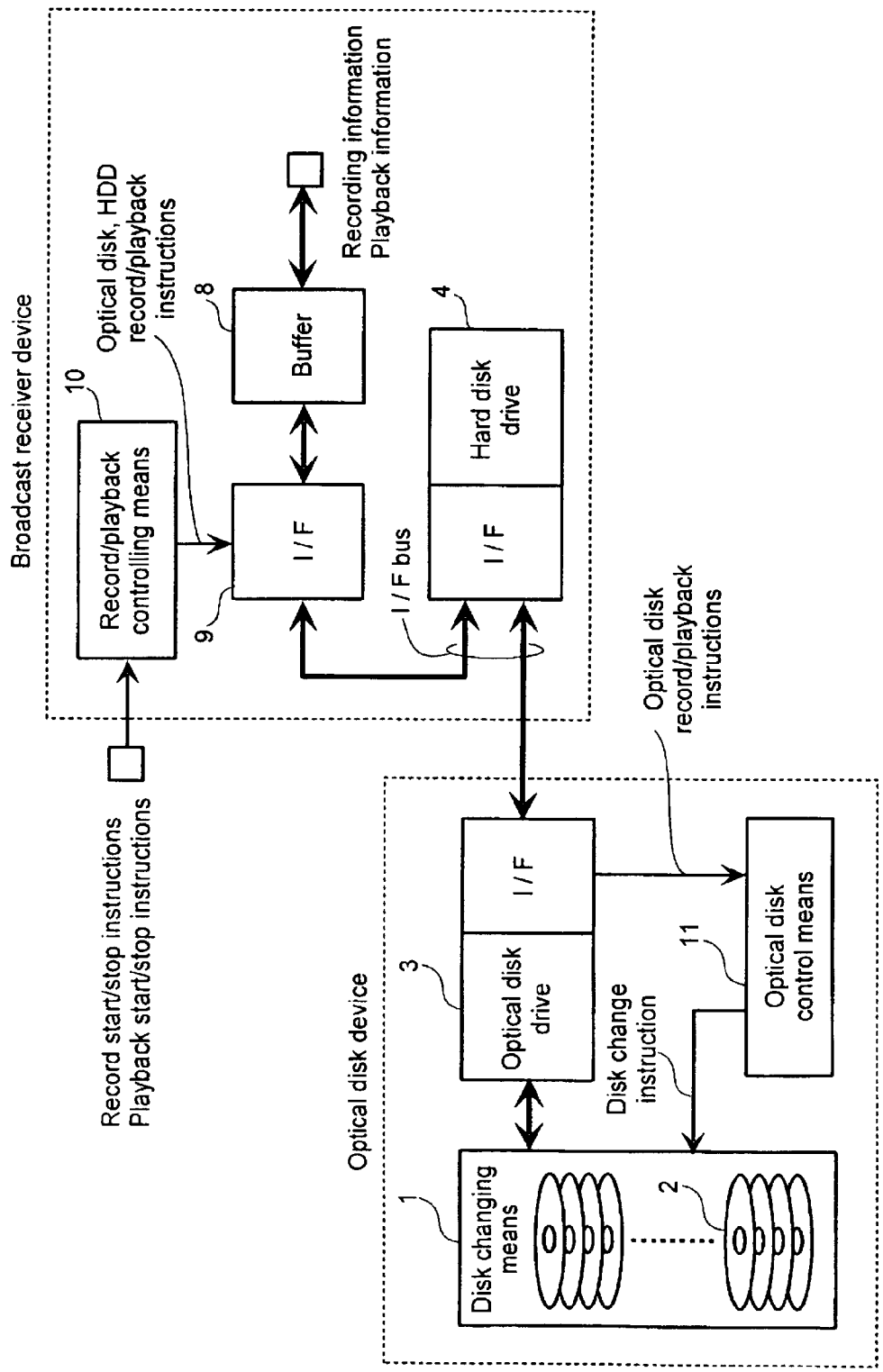
FIG. 11 is a drawing showing a third architecture of a recording/playback device.

FIG. 11 is a drawing showing a third embodiment of a recording/playback device according to the present invention. In this example, the HDD and the optical disk drive are connected using the IEEE-1394 serial interface standard. In the figure, the optical disk drive 3 is connected to interfacing means handling IEEE-1394. The HDD 4 is also connected to interfacing means. Interfacing means 9 is connected to the buffer 8, which temporarily records recording and playback information. These are connected to each other via an interface bus. Recording/playback controlling means 10 assigns leading regions and temporary regions on the HDD, manages and controls recording and playback operations on these regions, and manages and controls recording and playback operations on recording regions on single optical disks or recording regions spanning multiple optical disks. Optical disk controlling means 11 assigns recording regions on single optical disks or regions spanning multiple optical disks, and generates disk change instructions for disk changing means when a playback instruction requires a disk change. Disk changing means, the optical disk drive, and disk controlling means form an optical disk device. Also present are the HDD, the buffer, recording/playback controlling means. If a broadcast receiver tuner is also included, these would form a broadcast receiver device. Also, the interface standard used in the third embodiment does not have to be the IEEE-1394 standard and can be a different interface standard.

First, the recording of interface to the HDD and the optical disk will be described, with references to FIG. 11. Before recording/playback controlling means begins transferring recording information to the buffer, disk management information is read in to the HDD via interfacing means. Recording regions for a leading region and a temporary region are assigned based on the recording method described with reference to FIG. 1. A recording region is assigned in the optical disk as well to record information via interfacing means. For example, a recording region-can be assigned to span the first and the second optical disk as shown in FIG. 1 based on the disk management information on the multiple optical disks in disk changing means and managed by optical controlling means. The optical disk management information can, for example, be recorded on a separate optical disk or a separate recording medium. By playing this information, recording regions spanning multiple optical disks can be assigned. Optical disk controlling means transfers information about the recording region spanning the first and the second optical disks via interfacing means. Recording/playback controlling means then assigns information recording regions in this recording region as shown, for example, in FIG. 1. As a result, recording/playback controlling means can generate recording instructions and manage recording operations for the region assigned for recording on the first and the second optical disks, while simultaneously generating recording and playback instructions and managing playback operations for the leading region and the temporary region assigned on the HDD. This allows recording and playback operations for the HDD and the optical disk drive to be controlled as described with reference to FIG. 2 or FIG. 9, using the recording method described with reference to FIG. 1. Once the transfer of recording information to the buffer is begun, recording/playback controlling means generates recording instructions and playback instructions for the HDD in an alternating manner over time, generates recording instructions for the optical disk drive, performs recording operations and playback operations while controlling the unread block count in the leading region and the temporary region of the HDD as described with reference to FIG. 2 or FIG. 9, and controls recording operations to the recording region assigned on the optical disk mounted in the optical disk drive. With regard to the changing of disks to the second optical disk, optical disk controlling means receives via interfacing means an optical disk recording instruction that includes either the final block of the first optical disk or the final block in the assigned region of the first optical disk within the recording region spanning the first and the second optical disks. Once the recording operation of the final block is completed, optical disk controlling means determines the need for a disk change and generates a disk change instruction, and also sends an instruction via interfacing means to the HDD or recording/playback controlling means to stop generation of the next HDD playback instruction. Alternatively, the generation of the next HDD playback instruction is stopped by not indicating completion of the recording instruction to the optical disk to recording/playback means or the HDD. In some cases, the optical disk recording regions managed by recording/playback controlling means is only handled as a continuous recording region spanning the first and the second disk, and no distinction is made between the first and the second optical disk. In such cases, for the first and the second recording regions, optical disk controlling means manages at least the final block number of the first optical disk or the final block number of the region assigned on the first optical disk. This and the leading block number at which to start recording and the number of blocks to be transferred, contained in the optical disk recording instruction, are used to calculate the block number at which recording is completed. This is then used to determine when a disk change must take place. If, on the other hand, a distinction is made between the first and the second optical disks based on block numbers in the optical disk recording regions managed by recording/playback controlling means, then a disk change instruction is generated after recording/playback means issues a recording instruction up to the final block number of the first optical disk or the final block number in the region assigned on the first optical disk. Then, the optical disk device changes disks to the second optical disk specified by the instruction.

The following is a description of the playback of information recorded on the HDD and the optical disk as performed in FIG. 11. Recording/playback controlling means reads disk management information for the HDD via the interface before playback information is transferred from the buffer. Based on the playback method described with reference to FIG. 5, a temporary region is assigned in the recording region on the HDD. With the optical disk device, the first and the second optical disks are searched via interfacing means for the playback target, which is the information following the leading information on the HDD. Optical disk controlling means transfers information regarding the recording region spanning the first and the second optical disks as well as the region in which the information coming after the leading information is found. This information is transferred via interfacing means to recording/playback controlling means. Thus, recording/playback controlling means can generate playback instructions and manage playback operations for the recording region in the first and the second optical disks containing the information coming after the leading information while at the same time generating recording and playback instructions and managing recording and playback operations for the leading region and the temporary region assigned on the HDD. This allows recording and playback operations on the HDD and the optical disk drive to be controlled as described with reference to FIG. 6 or FIG. 10 according to the playback method described with reference to FIG. 5. To transfer playback information from the buffer, recording/playback controlling means issues recording instructions and playback instructions to the HDD in an alternating manner over time, while also generating playback instructions for the optical disk drive. The information recorded on the optical disk mounted in the optical disk drive is played back, and recording operations and the playback operations are performed while controlling the unread block count for the leading region and the temporary region in the HDD as described with reference to FIG. 6 or FIG. 10. The changing of disks to the second optical disk is as described in the recording operations presented above. When an optical disk playback instruction is received by interfacing means and contains the final block of the first optical disk or the final block of the region of the first optical disk on which playback information is recorded, optical disk controlling means determines the need for a disk change and generates a disk change instruction and stops generation of the next HDD recording instruction.

In the three embodiments described above, information corresponding to the leading information on the HDD is also recorded on the optical disk. However, as long as the leading information is available in the HDD, there is no need to record this on the optical disk. Also, if there are multiple sets of leading information on the HDD, these can be recorded to a separate recording medium, and if the HDD is changed these can be recorded to the new HDD. Also, instead of recording the leading information to a separate recording medium, data containing a number of blocks that takes disk changing time into account can be played back from the optical disk to be re-recorded to the HDD, thus allowing leading information to be restored.

Also, the present invention is not restricted to assigning leading information and temporary regions on the HDD. It would also be possible to use other recording medium having equal or greater transfer rates and access properties such as high-capacity semiconductor memory.

Also, the present invention is not restricted to recording and playing back information spanning a first and a second disk. Information spanning three or more optical disks can be recorded and played back as well. The present invention can also be used if a recording region of adequate size can be assigned on a single optical disk or if all the information following the leading information is recorded on a single optical disk.

Regarding the leading region and the temporary region assigned on the HDD, it would also be possible to perform the following operations before information is recorded to the optical disk. Based on the method described with reference to FIG. 3, trial recording and playback operations are performed on an available region of the HDD using dummy information or information that will not be recorded to the optical disk. This is done to determine if the region allows recording and playback operations to be alternated over time so that the relationship of (recording data size per unit time)<(playback data size per unit time) can be maintained. If this is not found to be the case, this trial evaluation is repeated for a different region. If the region fulfills the condition, the necessary numbers of blocks are assigned for the leading region and the temporary region within this region. For example, in order to perform this evaluation, recording and playback can be performed on an available region on the HDD in the vicinity of the region corresponding to the unread block count upper threshold M shown in FIG. 2 or FIG. 9. In particular, the execution time for recording and playback operations on the HDD can be minimized if the unread block count is controlled as described with reference to FIG. 9 and a region is found that fulfills the above condition and allows alternation of recording operations for the recording data size per unit time and playback operations for the playback data size per unit time corresponding to the maximum transfer rate of the optical disk. Regarding the relationship between the leading region and the temporary region assigned on the HDD using the evaluation method described above, these regions are assigned in a manner that allows playback operations to be performed so that the playback data size per unit time from the leading region is the same or greater than the recording data size per unit time from the temporary region.

Also, regarding the temporary region assigned on the HDD before information is played back from the optical disk, an available region can be tested by performing a trial recording and playback operation using dummy information or the like and determining whether recording and playback operations can be alternated over time while fulfilling the relationship (recording data size per unit time)>(playback data size per unit time). If the evaluation fails, this test is repeated on another region. If the evaluation is successful, the temporary region is assigned in this region with the necessary number of blocks. For example, to perform the evaluation described above, recording and playback operations can be performed on an available region on the HDD in the vicinity of the region corresponding to the unread block count upper threshold M shown in FIG. 6 or FIG. 10. In particular, the execution time for recording and playback operations on the HDD can be minimized if the unread block count is controlled as described with reference to FIG. 10, and a region is found that fulfills the above condition and alternates recording operations for the recording data size per unit time corresponding to the maximum transfer rate of the optical disk and playback operations corresponding to the playback data size per unit time. Regarding the relationship between the leading region and the temporary region assigned on the HDD using the evaluation method described above, these regions are assigned in a manner that allows recording operations to be performed so that the recording data size per unit time from the temporary region is the same or greater than the playback data size per unit time from the leading region.

In the present invention, recording information is recorded to span recording regions assigned to the first and the second optical disks. The HDD recording data size and playback data size per unit time are adjusted while performing recording and playback operations. This prevents gaps in the recording information even if a disk change occurs or if the optical disk is not ready for recording.

When playing back recorded information, the leading information recorded on the HDD is played back while the optical disk is being prepared for playback. This allows the playback delay time to be minimized. Also, if a disk change takes place, recording and playback operations can be controlled while adjusting the HDD playback data size and recording data size per unit time, thus preventing gaps in the playback information during playback operations.

What is claimed is:

1. An information device comprising:
 a first data transfer component configured to store recording information on a first recording medium;
 a second data transfer component configured to store recording information on a second recording medium and to retrieve recording information from said second recording medium; and
 a control circuit operatively coupled to said first and second data transfer components for data transfer therebetween,
 wherein said control circuit controls said second data transfer component to record a leading section of recording information on said second recording medium as leading information and to record subsequent recording information on said second recording medium as temporary information, wherein said control circuit further controls said second data transfer component to read out unread information first from said leading information, then from said temporary information so that continuity of recording information is maintained, wherein said control circuit further controls said first data transfer component to record said unread recording information to said first recording medium.

2. The information device as described in claim 1 wherein said temporary information is stored on a temporary area of second recording medium, said control circuit further controls said second data transfer component to read out unread information from a first portion of said temporary area while storing additional information to a second portion of said temporary area.

3. The information device as described in claim 1 wherein said first recording medium is a multiple-disk recording device; wherein regions assigned on said second recording medium for said leading information and said temporary information each contains at least (K×T) bits of information, where the transfer rate of information to be recorded on said second recording medium is no more than K bits/sec and the time needed to change disks in said multiple-disk recording device is no more than T seconds.

4. The information device as described in claim 1 wherein said first recording medium is a multiple-disk recording device; wherein, during at least a portion of an interval between the start of recording to said first recording medium and the completion of recording to said first recording medium, a first data rate at which information is read from said second recording medium exceeds a second data rate at which information is stored on said second recording medium; wherein said control circuit controls said first and second data rates such that (the size of a region for storing said temporary information)>=(the size of said unread information)+(the size of information transferred during a first time period), said first time period being the time needed to change disks in said multiple-disk recording device.

5. The information device as described in claim 4 wherein said first data rate is equal to a third data rate at which information is recorded on said first recording medium.

6. The information device as described in claim 5 wherein said first and third data rates each is less than or equal to the maximum data rate at which information can be recorded to said first recording medium.

7. The information device as described in claim 1 wherein said first recording medium is a multiple-disk recording device;

wherein upon completing recording to a first disk on said first recording medium, said control circuit controls said second transfer component to stop read out said temporary information from said second recording medium for a period of time during which a second disk on said first recording medium can be selected and to resume reading out said temporary information from said second recording medium after passage of said period of time, wherein said control circuit controls said first transfer component to record said temporary information which is resumed to be read out.

8. The information device as described in claim 1 wherein locations of regions on said second recording medium for said leading information and for said temporary information are selected so that a condition can be satisfied wherein a data rate for storing recording information on said second recording medium is less than a data rate for reading out recording information from said second recording medium.

9. The information device as described in claim 1 wherein locations of regions on said second recording medium for said leading information and for said temporary information are selected so that a condition can be satisfied wherein a data rate for reading out information from said second recording medium is equal to the maximum data rate for recording on said first recording medium.

10. The information device as described in claim 8 wherein said control circuit judges whether said condition is satisfied based on information other than said recording information.

11. An information device comprising:

a first data transfer component configured to retrieve recording information from a first recording medium;

a second data transfer component configured to store recording information on a second recording medium and to retrieve recording information from said second recording medium; and a control circuit operatively coupled to said first and second data transfer components for data transfer therebetween, wherein leading information is recorded on said second recording medium, and subsequent information subsequent to said leading information is recorded on said first recording medium, wherein said control circuit receives a playback signal and in response thereto controls said second data transfer component to search for said leading information and then to read out said leading information, said control circuit further configured to detect when said first recording medium is ready for reading out data and in response thereto to control said first data transfer component to read out said subsequent information from said first recording medium, said control circuit further configured to control said second data transfer component to record said subsequent information as temporary information on said second recording medium and to read out said temporary information so that continuity of recording information is maintained.

12. The information device as described in claim 11 wherein said first recording medium is a multiple-disk recording device; wherein regions assigned on said second recording medium for said temporary information contains at least (K×T) bits of information, where the transfer rate of information to be recorded on said second recording medium is no more than K bits/sec and the time needed to change disks in said multiple-disk recording device is no more than T seconds.

13. The information device as described in claim 11 wherein said first recording medium is a multiple-disk recording device; wherein during at least a portion of an interval between the start of reading out information from said first recording medium and the completion of reading out information from said first recording medium, a first data rate at which information is stored on said second recording medium exceeds a second data rate at which information is read from said second recording medium; wherein said control circuit controls said first and second data rates such that (the size of a region for storing said temporary information)>=(the size of said unread information)+(the size of information transferred during a first time period), said first time period being the time needed to change disks in said multiple-disk recording device.

14. The information device as described in claim 13 wherein said first data rate is equal to a third data rate at which information is read out from said first recording medium.

15. The information device as described in claim 14 wherein said first and third data rates each is less than or equal to the maximum data rate at which information can be read out from said first recording medium.

16. The information device as described in claim 11 wherein said first recording medium is a multiple-disk recording device;

wherein upon completing read out from a first disk on said first recording medium, said control circuit controls said second data transfer component to stop recording said temporary information on said second recording medium for a period of time during which a second disk on said first recording medium, which contains subsequent information, can be selected, wherein said control circuit is further controls said first data transfer component to resume read out said subsequent information from said second disk after passage of said period of time, wherein said control circuit is further controls said second transfer component to record said subsequent information as temporary information on said second recording medium.

17. The information device as described in claim 11 wherein locations of regions on said second recording medium for said temporary information are selected so that a condition can be satisfied wherein a data rate for storing recording information on said second recording medium is more than a data rate for reading out recording information from said second recording medium.

18. The information device as described in claim 11 wherein locations of regions on said second recording medium for said temporary information are selected so that a condition can be satisfied wherein a data rate for recording information on said second recording medium is equal to the maximum data rate for reading out from said first recording medium.

19. The information device as described in claim 18 wherein said control circuit judges whether said condition is satisfied based on information other than said recording information.

20. In an information device having a first recording medium and a second recording medium, a method for storing recording information comprising:

receiving recording information and storing it on said second recording medium, including producing a leading information portion and a temporary information portion;

reading out said leading information portion and storing it on said first recording medium;

reading out a first part of said temporary information portion and storing it on said first recording medium while receiving additional recording information and storing it to a second part of said temporary information portion.

21. The method as claimed in claim 20 wherein:

after recording operations to said selected first recording medium is finished, playback of said temporary information only is stopped and a different first recording medium is selected;

when said different first recording medium is capable of recording, unread information in said temporary information is played back to maintain continuity; and said played back information is recorded to said first recording medium.

22. The method as claimed in claim 20 further including an information playback method comprising the steps of:

in response to a request to transfer playback information, playing back unread information in said leading information and said temporary information on said second recording medium in order to maintain continuity;

when said first recording medium is ready for playback, playing back information subsequent to said leading information recorded on said recording medium; and recording said played back information to said second recording medium.

23. The method as claimed in claim 22 wherein:

after playback of said selected first recording medium is completed, only recording of said temporary information is stopped and a different first recording medium containing subsequent information is selected; and when said different first recording medium is ready for playback, said subsequent information is played back and also recorded as said temporary information.

24. An information device comprising:

a first data transfer component configured to store recording information on a first recording medium and to retrieve recording information from said first recording medium;

a second data transfer component configured to store recording information on a second recording medium and to retrieve recording information from said second recording medium; and a control circuit operatively coupled to said first and second data transfer components for data transfer therebetween, wherein said control circuit receives a recording signal and in response thereto controls said second data transfer component to record a leading section of recording information on said second recording medium as leading information, wherein said control circuit receives a playback signal and in response thereto controls said second data transfer component to search for leading information stored on said second recording medium and then playback said leading information.

25. In an information device having a first recording medium and a second recording medium, a method for storing and playing back recording information comprising:

receiving recording information and storing it on said second recording medium, said recording information as stored thereon comprising a leading information portion and a temporary information portion;

in response to a request to transfer playback information, playing back said temporary information portion and storing it on said first recording medium.

* * * * *